United States Patent
Kellermann et al.

(10) Patent No.: US 10,200,290 B2
(45) Date of Patent: Feb. 5, 2019

(54) STATION AND METHOD FOR SERIAL DATA TRANSMISSION USING DYNAMIC REPRIORITIZING OF DATA FRAMES

(71) Applicant: Bayerische Motoren Werke Aktiengesellschaft, Munich (DE)

(72) Inventors: Helmut Kellermann, Oberschleissheim (DE); Hyung-Taek Lim, Munich (DE); Thomas Gehrsitz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 14 days.

(21) Appl. No.: 15/411,325

(22) Filed: Jan. 20, 2017

(65) Prior Publication Data

US 2017/0134292 A1 May 11, 2017

Related U.S. Application Data

(63) Continuation of application No. PCT/EP2015/064817, filed on Jun. 30, 2015.

(30) Foreign Application Priority Data

Jul. 23, 2014 (DE) .......................... 10 2014 214 457

(51) Int. Cl.
*H04L 12/833* (2013.01)
*H04L 12/413* (2006.01)
(Continued)

(52) U.S. Cl.
CPC ........ *H04L 47/2458* (2013.01); *H04L 12/413* (2013.01); *H04L 47/12* (2013.01);
(Continued)

(58) Field of Classification Search
None
See application file for complete search history.

(56) References Cited

U.S. PATENT DOCUMENTS 4,896,261 A    1/1990  Nolan
5,852,723 A *  12/1998 Kalkunte .......... H04L 12/40156
                                                709/235
(Continued)

FOREIGN PATENT DOCUMENTS

DE        102 26 107 A1    1/2004
DE    10 2009 006 898 A1   8/2009

OTHER PUBLICATIONS

PCT/EP2015/064817, International Search Report dated Sep. 17, 2015 (Three (3) pages).
(Continued)

Primary Examiner — Robert C Scheibel
(74) Attorney, Agent, or Firm — Crowell & Moring LLP

(57) ABSTRACT

A method for operating a station for serial data transmission using data frames in a communication network, configured to perform a carrier sense multiple access with collision avoidance (CSMA/CA) method, includes performing a first priority resolution for a specific first data frame to be transmitted on a communication channel, and establishing whether the specific first data frame to be transmitted has a highest priority. The method also includes performing a first backoff if the specific first data frame has the highest priority, transmitting the specific first data frame if the communication channel is free after the backoff, and raising the priority of the specific first data frame, in the absence of acknowledgement of the transmission of the specific data frame, to a priority level that is used exclusively for untransmitted data frames.

15 Claims, 3 Drawing Sheets

(51) Int. Cl.
 *H04L 12/851* (2013.01)
 *H04L 12/801* (2013.01)
 *H04L 12/40* (2006.01)

(52) U.S. Cl.
 CPC ............ *H04L 47/245* (2013.01); *H04L 47/13* (2013.01); *H04L 47/24* (2013.01); *H04L 2012/40273* (2013.01)

(56) References Cited

U.S. PATENT DOCUMENTS

| | | |
|---|---|---|
| 9,888,489 B2 * | 2/2018 | Li .................... H04W 76/14 |
| 2002/0146032 A1 * | 10/2002 | Attimont .......... H04L 12/40169 |
| | | 370/448 |
| 2004/0264494 A1 | 12/2004 | Kim |
| 2005/0141480 A1 | 6/2005 | Jin et al. |
| 2007/0150616 A1 * | 6/2007 | Baek .................. H04L 12/2803 |
| | | 709/246 |
| 2012/0174177 A1 | 7/2012 | Bartholomay et al. |

OTHER PUBLICATIONS

German Search Report issued in German counterpart application No. 10 2014 214 457.4 dated Mar. 12, 2015, with Statement of Relevancy (Eleven (11) pages).

\* cited by examiner

STATION AND METHOD FOR SERIAL DATA TRANSMISSION USING DYNAMIC REPRIORITIZING OF DATA FRAMES

CROSS REFERENCE TO RELATED APPLICATIONS

This application is a continuation of PCT International Application No. PCT/EP2015/064817, filed Jun. 30, 2015, which claims priority under 35 U.S.C. § 119 from German Patent Application No. 10 2014 214 457.4, filed Jul. 23, 2014, the entire disclosures of which are herein expressly incorporated by reference.

BACKGROUND AND SUMMARY OF THE INVENTION

The invention relates to a station and a method for data transmission by means of data frames in a communication network, particularly in a carrier sense multiple access with collision avoidance (CSMA/CA) method.

The number of electronic systems in motor vehicles has increased substantially in recent decades. Therefore, the technical equipment of motor vehicles now has a multiplicity of electronic systems that control the motor vehicle and that, in some cases, replace mechanical systems.

Since conventional wiring requires one line for each piece of information, the length and weight of the wiring harness and the number of connections on the controllers increase as the scope of functions of the vehicle electronics increases. This has been remedied to date by a data bus, particularly a CAN (controller area network) bus, that transmits all of the information via two lines. Such a data bus connects a multiplicity of controllers to one another that cooperate in a vehicle. In this case, the connected controllers can interchange information with one another via the data bus. For the purpose of data transmission, the individual controllers are networked to one another in the bus system. When a station or a controller transmits information to the bus system by means of a data frame, other stations or controllers can monitor or "listen to" this information. Stations for which the information in the data frame is relevant will use said information, while other stations ignore this data frame.

With the progressive increase in controllers that are meant to communicate via the bus systems present in the motor vehicle, particularly from the fields of telematics, media and audio and automation of the vehicle, the problem arises that more and more data volumes and hence data frames need to be transmitted via the existing bus systems. The serial mode of transmission means that this often results in an overload or "congestion" in the data traffic of such a communication network.

Independently of this, from economic and ecological aspects, particularly against the background of the increasing electrification of the drivetrain of motor vehicles, vehicle manufacturers wish to save weight in the motor vehicles and to combine systems or even to use the powerlines that are used for supplying power to the stations or controllers as a bus system, i.e. to use this supply of power to set up what is known as a PowerLan, dLan (direct LAN) or PowerLan Communication (PLC), particularly according to the IEEE 1901 standard.

By way of example, the use of media access by carrier sense multiple access with collision avoidance method in the IEEE 1901 standard involves the use of a backoff mechanism, which is comparable with a backoff mechanism from the IEEE 802.11 standard. In addition, four access priorities are defined (CA0 to CA3, where CA0 is the lowest priority and CA3 is the highest priority). Before the stations can start a backoff process, a priority resolution is performed as standard. During the priority resolution, each station sends signals in priority resolution slots in order to announce the highest priority for which it currently has a data frame for transmission in its queue. When four access priorities are defined, all of the priorities could be defined using two priority resolution slots or signals or bits. After the priority resolution, all stations in the network know the highest priority for which a station holds a data frame for transmission in the respective queue. Only those stations that have a data frame at this highest priority in their queue are permitted to start a backoff process thereafter.

The backoff mechanism is used to decrease a probability of collisions. To this end, a station uses the random principle to select one value from a prescribed time interval. The selected value indicates the period for which a station waits before it starts a transmission attempt via a communication channel. If, during the wait, it is established that the communication channel is already occupied, then the station pauses the backoff and continues it after the communication channel has been identified as free again for a sufficient period.

That station that has selected the shortest period or the lowest value from the prescribed interval gets its chance to transmit during the backoff.

Furthermore, the IEEE 1901 standard specifies that a station monitors how often it has been interrupted while performing a backoff process. The "deferral counter" backoff parameter indicates how often a station can be interrupted before it starts a further backoff process. In this further backoff process, the interval for random selection of the value for the waiting time is extended in order to decrease the probability of collision with other stations. This is intended to further reduce the probability of collision when a communication channel is subject to a high workload, usually caused by a large number of stations in a communication network, since this increases the number of selectable values in the backoff and this reduces the probability of collision.

For a comparatively small number of stations, as typically arises in the home network area, the combination of priority resolution and backoff mechanism works reliably. If the number of stations increases significantly, however, then the backoff mechanism is no longer able to reduce the probability of collision to a sufficient extent, since there is a very large number of data frames with the same priority. The result is an increased number of colliding data frames on the communication channel, which in turn result in an increased workload for the communication channel, since data frames that have collided are transmitted again. A collision or nontransmission of the data frames is identified by a station from the absence of an acknowledgement (ACK).

US 2005/0141480 A1 discloses a method for transmitting multimedia data between wireless and wired networks. The method includes the capture of data frames of a first communication protocol type from a first network and the conversion of the received data frames into data frames of a second communication protocol type, with the transmission priority order of the data frames that are converted into the second communication protocol type being determined on the basis of the packet information of the received data frames. The data frames are transmitted to a second network on the basis of the determined transmission priority order.

It is an object of the invention to provide an apparatus and a method in order to improve the serial data transmission, particularly in order to prevent the number of colliding data frames during a communication on a communication channel from increasing.

The station according to the invention for data transmission by means of data frames in a communication network, particularly in a carrier sense multiple access with collision avoidance method, has a first classification device, set up to perform the first priority resolution for a specifically transmitted data frame; the station furthermore preferably has a processing device, set up to establish whether the specific data frame to be transmitted has a highest priority, and a selection device, set up to perform a backoff if the specific data frame has the highest priority. The station furthermore preferably has a transmission device, set up to send a data frame and a reprioritization device, set up, in the absence of acknowledgement of the transmission, to raise the priority of the specific data frame, particularly to a priority level that is used exclusively for collided or untransmitted data frames.

The method according to the invention for operating a station for data transmission by means of data frames in a communication network using carrier sense multiple access with collision avoidance (CSMA/CA) methods preferably has the following work steps for a communication: performance of a first priority resolution for a specific data frame to be transmitted on a communication channel; establishment of whether the specific data frame to be transmitted has a highest priority; if the specific data frame has the highest priority, performance of a backoff; if the communication channel is free after the backoff, sending of the specific data frame; and, in the absence of acknowledgement of the transmission, raising of the priority of the specific data frame, particularly to a priority level that is used exclusively for collided or untransmitted data frames.

The method according to the invention for data transmission by means of data frames in a communication network having a plurality of stations using a carrier sense multiple access with collision avoidance (CSMA/CA) method preferably has the following work steps in a communication by the plurality of stations: performance of a first priority resolution for data frames to be transmitted by the plurality of stations on a communication channel; performance of a backoff by at least one first station that has a first data frame to be transmitted having the highest priority; if the communication channel is free after the backoff, sending of a first data frame by the at least one first station; and, in the absence of acknowledgement of the transmission to the at least one first station, raising of the priority of the first data frame, particularly to a reprioritization priority that is used exclusively for collided or untransmitted data frames.

A station within the context of the invention is a subscriber to a communication in a communication network.

A data frame within the context of the invention is a data unit of a protocol. A data frame preferably consists of destination and source addresses, control information for data flow control, user data of a data packet and/or a checksum for ensuring data integrity.

A communication channel within the context of the invention is a transmission medium that can be used jointly by a plurality of stations.

A priority resolution within the context of the invention comprises an examination of individual data frames or messages that contain these data frames for a predefined priority for the data frame and an identification of the data frame having the highest priority or preferably a priority graduation between a plurality of data frames or messages containing them.

A backoff within the context of the invention is a mechanism for preventing the collision of data frames or messages from different stations during transmission on a communication channel, in which each station, starting from a predefined time, waits for a period of time, preferably selected using the random principle, in order to start a transmission A reprioritization within the context of the invention is a change of the priority with which a data frame or a message containing this data frame is intended to be transmitted.

The invention is based on the approach of dynamically managing priorities associated with the data frames to be transmitted. When a station establishes that a data frame it has sent has collided with another transmission, which is identified particularly from the absence of an acknowledgement, the data frame is raised to another priority level, particularly one that is higher and not used as standard. The effect achieved by this is that on the next transmission attempt, a backoff is started essentially only for those data frames that have collided during the previous transmission attempt. This does not increase the number of data frames to be transmitted for which the backoff is performed. In combination with an extended interval for random selection of the start of transmission during a backoff ("deferral counter"), this even reduces the probability of another collision. The invention can be used particularly in the IEEE 1901 PowerLan standard, but also for any other type of method for serial data transmission.

In one advantageous refinement of the method according to the invention for serial data transmission, said method furthermore has at least one of the work steps of performance of a second priority resolution for data frames to be transmitted by the plurality of stations on the communication channel, performance of a backoff by at least one second station that has a second data frame to be transmitted having the highest priority, and, if the communication channel is free after the backoff, sending of the second data frame by the at least one second station.

In this advantageous refinement of the method according to the invention, it is possible, in principle for all stations that have data frames to be sent in their queues to get their chance during a priority resolution. The backoff is started only by those stations that have data frames to be transmitted having the highest priority. This ensures that, if collisions occurred at lower priorities after the previous backoff, then these do not hamper the transmission of data frames having a higher priority in subsequent transmission cycles. Normally, however, those data frames whose transmission priority has been raised will have the highest priority, so that the second backoff is in turn performed between these first data frames or messages.

In a further advantageous refinement of the method according to the invention, said method furthermore has at least one of the work steps of performance of a second priority resolution for data frames to be transmitted via the plurality of stations on the communication channel, performance of a second backoff by at least two first stations that have a first data frame to be transmitted having a raised priority, and, if the communication channel is free after the second backoff, sending of a first data frame by at least one first station.

In this advantageous refinement, after the second priority resolution, only those stations whose data frames or messages containing them have collided during the first transmission attempt and have consequently been provided with a raised priority get their chance. This ensures that collided data frames can be transmitted without further time delay.

In a further advantageous refinement of the method according to the invention, an interval for selecting the start of sending of the second backoff is longer than an interval for selecting the start of sending of the first backoff.

The lengthening of the interval results in more options at the start of a sending process for the stations participating in the backoff. This reduces the probability of another collision.

In a further advantageous refinement of the method according to the invention, said method has four possible priorities for data frames.

In a further advantageous refinement of the method according to the invention, said method has standard priorities and at least one reprioritization priority.

In a further advantageous refinement of the method according to the invention, a raising of the priority is always effected to a reprioritization priority.

In a further advantageous refinement of the method according to the invention, said method has a number of standard priorities, particularly two standard priorities, and the same number of reprioritization priorities.

In a further advantageous refinement of the method according to the invention, a respective reprioritization priority is arranged above a standard priority, and a raising of the priority is always effected to the higher reprioritization priority.

A provision of different reprioritization priorities for different standard initial priorities allows a graduation of the priorities to be achieved after a reprioritization. If, after the reprioritization of a data frame having a lower priority, there is still a data frame having a higher-priority standard priority in a queue of a station, then said data frame can preferably be transmitted, without a delay.

In a further advantageous refinement of the method according to the invention, data frames having a reprioritization priority are prioritized higher than data frames having a standard priority during a priority resolution.

The aspects of the invention that have been described above and the associated features disclosed for the development of the method for serial data transmission by means of data frames and for the method for operating a station for serial data transmission also apply to a station for serial data transmission in a corresponding manner.

Further features, advantages and opportunities for application of the invention will emerge from the description below in conjunction with the figures, in which Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
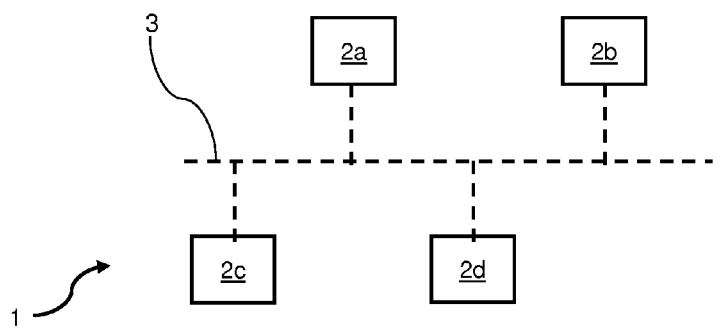
FIG. 1 shows a partially schematic representation of a communication network in which the methods according to the invention are used.

FIG. 1 shows an example of a communication network in which the method according to the invention for serial data transmission is preferably used. This communication network has multiple stations 2a, 2b, 2c, 2d, . . . in which the method according to the invention for operating a station is in turn preferably used. By way of example, these stations are controllers and particularly subscribes to a serial data transmission. The communication network 1 is particularly a communication network of a vehicle, particularly of a motor vehicle, and the stations or controllers 2a to 2d control or perform different functions for driving or other functions, e.g. multimedia functions of the vehicle. In the communication network 1, the individual stations 2a to 2d are connectable via a jointly used communication channel 3. The communication network 1 is preferably a WLAN network, a CAN network, a PowerLan network, a radio network or the like, so that the communication channel can be performed on a physical level by wire, optically or acoustically.

Figure 2:
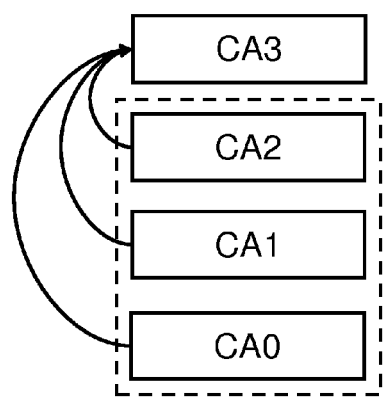
FIG. 2 shows a schematic block diagram of a reprioritization according to the invention in a first embodiment.

FIG. 2 schematically represents four priorities CA0, CA1, CA2, CA3 for data packets. In the embodiment represented, there are three standard priorities CA0, CA1 and CA2. The priority CA3 is a reprioritization priority that is associated with all data frames or messages that undergo a reprioritization.

Figure 3:
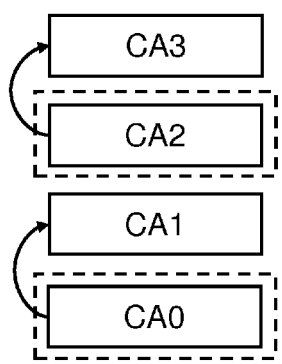
FIG. 3 shows a schematic block diagram of a reprioritization according to the invention in a second embodiment.

FIG. 3 shows a second embodiment of possible priorities of data frames on a communication channel 3. In this embodiment, there are two standard priorities, denoted by the dashed borders CA0 and CA2. A reprioritization from these standard priorities is performed in this case to respective separate reprioritization priorities CA1 and CA3. In comparison with a reprioritization to a standard highest priority, as represented in the embodiment of FIG. 2, this affords the advantage that messages having a high priority CA2 that are intended to be sent after a reprioritization of data frames from the standard priority CA0 to the reprioritization priority CA1 can still be sent without time delay, since the data frames having the priority CA1 are set aside.

Figure 4:
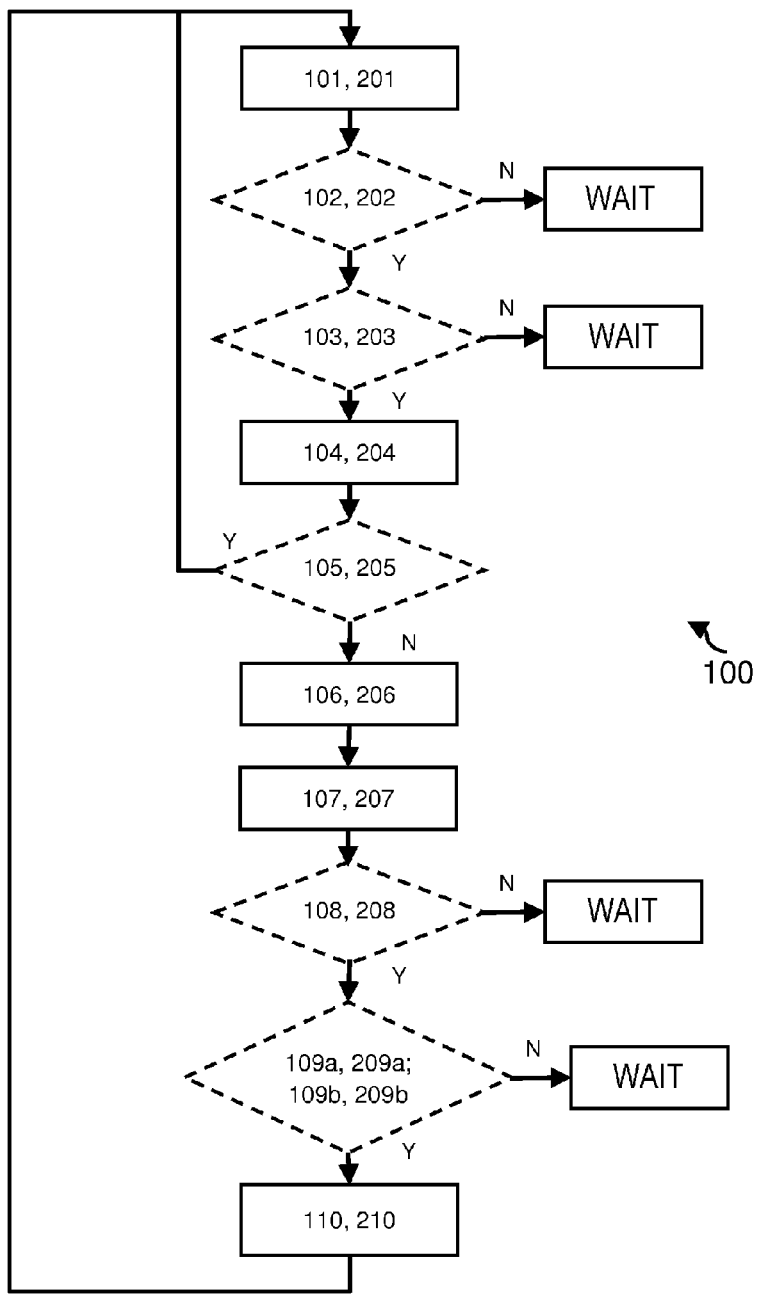
FIG. 4 shows a partially schematic block diagram of the methods according to the invention for serial data transmission and for operating a station according to the invention.

FIG. 4 shows a partially schematic block diagram of an embodiment of the method according to the invention for serial data transmission. Aspects of the work steps are represented in dashes in the advantageous refinement. In this case, the order of execution of the work steps is preferably as represented, but may also differ therefrom.

Preferably, the method according to the invention involves a priority resolution being performed by each station 101. This priority resolution involves a check being performed to determine whether a specific data frame to be transmitted (also) has the highest priority in comparison with data frames that other stations wish to transmit. If it is established that the specific data frame does not have the highest priority, then the respective station enters a wait state 102, 202 (N) in which it monitors the communication on the communication channel 3 or else enters an idle state until the next priority resolution. If, by contrast, a station establishes that a data frame having the highest priority appears in its queue 102, 202 (Y), then the respective station performs a backoff 103, 203. This backoff involves the respective station waiting for a random period of time before it starts sending the data frame having the highest priority or the message of said data frame. As part of the backoff, immediately before sending is started, another check is performed to determine whether the communication channel 3 is occupied. If another station has already started transmission, then the communication channel is occupied and the respective station likewise enters a wait state 103, 203 (N). If the communication channel is not occupied 103, 203 (Y), then the station sends the data frame 104, 204. If the station then receives an acknowledgement that the data frame has been transmitted 105, 205 (Y), then the method preferably starts over. If the station does not receive an acknowledgement 105, 205 (Y), then it knows that there was a collision with other data frames and that the data frame has not been transmitted. The priority of the unsent data frame is then preferably raised 106, 206. In particular, as shown in the embodiments of FIGS. 2 and 3, reprioritization priorities CA3 or CA1, CA3 are provided therefor that are used exclusively for untransmitted or collided data frames. In this case too, a priority resolution for data frames to be transmitted on the communication channel 3 in turn takes place, and it is established whether a data frame in the queue of the reprioritized data frame has the highest priority 108, 208. Depending on whether the reprioritization priority CA1, CA3 is the highest possible priority 108, 208 (Y), or whether there are also higher standard priorities 108, 208 (N), only stations that have performed a reprioritization in the preceding step get their chance. On the basis of this, a further backoff is performed in which the stations having data frames having the highest priority or having the raised priority participate 109, 209a, 109b, 209b. Stations that do not get their chance during the backoff in turn enter the wait state 109a, 209a, 109b, 209b(N). Those stations that get their chance during the backoff 109a, 209a; 109b, 209b(Y) send a data frame 110, 210. Preferably, this procedure is repeated until a communication in the communication network 1 by the stations 2a to 2d is at an end.

LIST OF REFERENCE SYMBOLS

Communication network 1
Stations 2a, 2b, 2c, 2d
Communication channel 3
Priority CA0, CA1, CA2, CA3

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A station for serial data transmission using data frames in a communication network having a plurality of stations, the station configured to perform a carrier sense multiple access with collision avoidance (CSMA/CA) method, wherein the station comprises:
   a classification device configured to perform a first priority resolution for a specific data frame to be transmitted on a communication channel;
   a processing device configured to establish whether the specific data frame to be transmitted has a highest priority for data frames queued by the plurality of stations for transmission on the communication channel;
   a selection device configured to perform a first backoff if the specific data frame has the highest priority;
   a transmission device configured to transmit the specific data frame; and
   a reprioritization device configured to raise the priority of the specific data frame, in the absence of acknowledgement of the transmission of the specific data frame, to a priority level that is used exclusively for collided data frames.

2. A method for operating a station for serial data transmission using data frames in a communication network having a plurality of stations, the station configured to perform a carrier sense multiple access with collision avoidance (CSMA/CA) method, wherein the method comprises the acts of:
   performing a first priority resolution for a specific first data frame to be transmitted on a communication channel;
   establishing whether the specific first data frame to be transmitted has a highest priority for data frames queued by the plurality of stations for transmission on the communication channel;
   performing a first backoff if the specific first data frame has the highest priority;
   transmitting the specific first data frame if the communication channel is free after the backoff; and
   raising the priority of the specific first data frame, in the absence of acknowledgement of the transmission of the specific data frame, to a priority level that is used exclusively for collided data frames.

3. A method for operating a station for serial data transmission using data frames in a communication network configured to perform a carrier sense multiple access with collision avoidance (CSMA/CA) method by a plurality of stations, wherein the method comprises the acts of:
   performing a first priority resolution for data frames to be transmitted by the plurality of stations on a communication channel;
   performing a first backoff by at least a first station of the plurality of stations that has a data frame to be transmitted having a highest priority for data frames queued by the plurality of stations for transmission on the communication channel;
   transmitting a first data frame by at least the first station if the communication channel is free after the backoff; and
   raising of the priority of the first data frame, in the absence of acknowledgement of the transmission of the first data frame station, to a reprioritization priority that is used exclusively for collided data frames.

4. The method as claimed in claim 2, further comprising the acts of:
   performing a second priority resolution for data frames to be transmitted by the plurality of stations on the communication channel;
   performing a second backoff by at least a second station of the plurality of stations that has a data frame to be transmitted having the highest priority; and
   transmitting a second data frame via the at least second station if the communication channel is free after the second backoff.

5. The method as claimed in claim 3, further comprising the acts of:
   performing a second priority resolution for data frames to be transmitted by the plurality of stations on the communication channel;
   performing a second backoff by at least a second station of the plurality of stations that has a data frame to be transmitted having the highest priority; and
   transmitting a second data frame via the at least second station if the communication channel is free after the second backoff.

6. The method as claimed in claim 2, further comprising the acts of:
   performing a second priority resolution for data frames to be transmitted by the plurality of stations on the communication channel;

performance of a second backoff by at least two first stations of the plurality of stations that have a first data frame to be transmitted having a raised priority; and transmitting a first data frame by at least one first station if the communication channel is free after the second backoff.

7. The method as claimed in claim 3, further comprising the acts of:

performing a second priority resolution for data frames to be transmitted by the plurality of stations on the communication channel;

performance of a second backoff by at least two first stations of the plurality of stations that have a first data frame to be transmitted having a raised priority; and transmitting a first data frame by at least one first station if the communication channel is free after the second backoff.

8. The method as claimed in claim 4, wherein a second interval for selecting the start of sending of the second backoff is longer than a corresponding first interval for the first backoff.

9. The method as claimed in claim 6, wherein a second interval for selecting the start of sending of the second backoff is longer than a corresponding first interval for the first backoff.

10. The method as claimed in claim 3, wherein there are four possible priorities.

11. The method as claimed in claim 3, wherein there are a plurality of standard priorities and at least one reprioritization priority.

12. The method as claimed in claim 11, wherein raising the priority of the first data frame comprises raising of the priority of the first data frame to one of the at least one reprioritization priority.

13. The method as claimed in claim 2, wherein there are a plurality of standard priorities and a same number of reprioritization priorities.

14. The method as claimed in claim 13, wherein a respective reprioritization priority is arranged above a standard priority and wherein a raising of the priority is always effected to higher reprioritization priority.

15. The method as claimed in claim 10, wherein data frames having a reprioritization priority are prioritized higher than data frames having a standard priority during a priority resolution.

* * * * *